F. BENJAMIN.
ICE CREAM DIPPER.
APPLICATION FILED MAR. 12, 1908.
925,275.
Patented June 15, 1909.
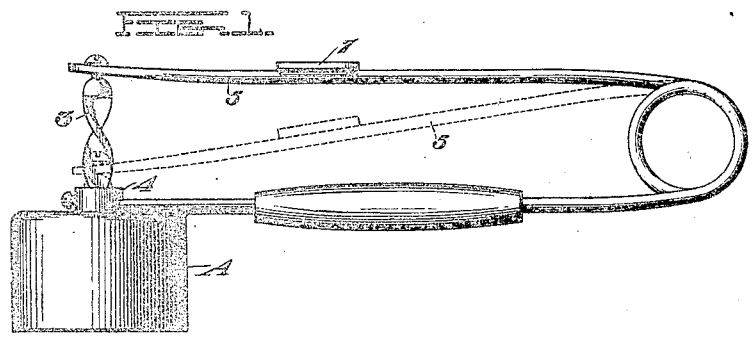
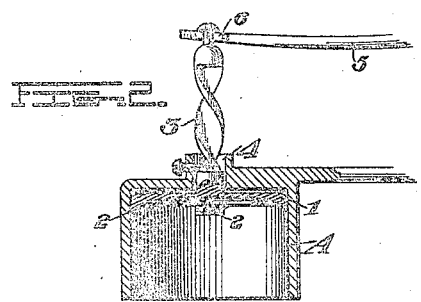
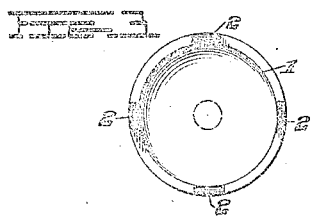
Witnesses
Lloyd W. Patch
J. P. Campbell
Inventor
Frank Benjamin
his Attorney

UNITED STATES PATENT OFFICE.

FRANK BENJAMIN, OF TROY, NEW YORK, ASSIGNOR OF ONE-HALF TO ITHAMAR W. COPELAND, OF TROY, NEW YORK.

ICE-CREAM DIPPER.

No. 925,275.  Specification of Letters Patent.  Patented June 15, 1909.

Application filed March 12, 1908. Serial No. 420,567.

*To all whom it may concern:*

Be it known that I, FRANK BENJAMIN, a citizen of the United States, residing at Troy, in the county of Rensselaer and State of New York, have invented certain new and useful Improvements in Ice-Cream Dippers, of which the following is a specification.

My invention relates to an improvement in ice cream dippers, the primary object being to provide a device for scooping ice cream from the freezer or other receptacle, and quickly discharging it from the dipper when it is desired to do so.

My invention further consists in certain novel features of construction and combinations of parts which will be hereinafter described and pointed out in the claims.

In the accompanying drawings:—Figure 1 is a view in side elevation, the dotted lines showing the position of the handle while ejecting the contents of the dipper. Fig. 2 is a cross-sectional view. Fig. 3 is a detail of the plunger and cutters.

A, represents a dipper preferably of cylindrical form and of any desired capacity. Within the dipper the plunger 1 is fitted. This is preferably concavo-convex in form and provided with a plurality of outwardly projecting cutters 2, 2, adapted to cut the cream from the walls of the dipper as the plunger is forced outwardly and rotated. As intimated, the plunger is not only intended to reciprocate, but also to rotate; as a simple means for accomplishing this, it is secured to the inner end of a stem 3 preferably in the form of a spiral or Archimedean screw, which latter is fitted to slide and turn in a sleeve 4 on the back of the dipper which affords a guide for the screw. A set screw extending into the sleeve engages the spiral or Archimedean screw whereby to insure its rotation as it is moved in and out.

The spiral or Archimedean screw is adapted to be reciprocated in any approved manner, and as a convenient means of accomplishing this, a spring handle 5 is employed, one end being integral with the dipper, and the opposite end having an elongated slot 6, therein, to receive the outer end of the spiral or Archimedean screw in which the latter turns freely. A thumb piece 7 on the free end of the handle is adapted to receive the operator's thumb whereby to operate the plunger by pressing upon the thumb piece, and causing the plunger to move outwardly within the dipper. The tension of the spring portion of the handle returns the plunger to the bottom of the dipper and the parts to their normal position as shown in full lines in Fig. 1.

The device is thus a simple and inexpensive one, and yet effectual in the performance of its function for the handle not only serves as a means for manipulating the dipper in scooping the cream from the freezer or receptacle in which it is contained in bulk, but also has the additional function of operating and controlling the plunger. In other words, the plunger is forced outwardly to eject the cream from the dipper by pressing the handle whether it be done by pressing the thumb upon the thumb piece, or merely grasping the handle and squeezing it, and the spring tension of the handle is sufficient to always withdraw the plunger to the bottom of the dipper preparatory to its use again. The cutters on the plunger follow the inner cylindrical walls of the dipper and loosen the cream all the way out so that it lessens the resistance, which would otherwise result from a straight outward push of the plunger, and it scoops the frozen cream from the walls of the dipper.

It will be seen from the foregoing that a simple and very inexpensive article is provided for use at soda fountains, and at restaurants in the dispensing of ice cream.

It is evident that more or less slight changes might be resorted to in the form and arrangement of the several parts described without departing from the spirit and scope of my invention, and hence I do not wish to limit myself to the construction herein set forth, but:—

Having fully described my invention, what I claim as new and desire to secure by Letters Patent, is:—

1. An ice cream dipper comprising a cup provided with an orifice through its bottom, a plunger fitted in the cup and having a spiral stem which passes out through the orifice in the bottom of the cup in position to be pushed to cause the plunger to revolve and move forward to remove the contents of the cup.

2. An ice cream dipper comprising a cup provided with an orifice through its bottom, a plunger fitted in the cup and having a spiral stem which passes out through the orifice in the bottom of the cup in position to be pushed to cause the plunger to remove the contents of the cup, and means engaging the spiral stem for rotating the stem and plunger as the latter are forced outwardly in the cup.

3. An ice cream dipper comprising a cup provided with an orifice through its bottom, a plunger fitted in the cup and having a stem which passes out through the orifice in the bottom of the cup in position to be pushed to cause the plunger to remove the contents of the cup, means for rotating the stem and plunger as the latter are forced outwardly in the cup, and a handle connected at one end to the cup and at the other end to the outer end of the stem whereby the compression of the handle causes the plunger to reciprocate in the cup.

4. An ice cream dipper comprising a cup provided with an orifice through its bottom, a plunger fitted in the cup and having a stem which passes out through the orifice in the bottom of the cup in position to be pushed to cause the plunger to remove the contents of the cup, means for rotating the stem and plunger as the latter are forced outwardly in the cup, and a handle connected at one end to the cup and at the other end to the outer end of the stem whereby the compression of the handle causes the plunger to reciprocate and turn in the cup.

5. In an ice cream dipper, the combination with a cup having a sleeve on its bottom, a spiral Archimedean screw fitted in the sleeve, and a set screw extending into the sleeve to the spiral or Archimedean screw to cause the latter to revolve as it is reciprocated, of a handle secured at one end to the cup and its opposite end having the spiral or Archimedean screw rotatably connected therewith whereby as the handle is compressed, the screw is reciprocated and rotated, and a plunger secured to the opposite end of the screw.

6. In an ice cream dipper, the combination with a cup having a sleeve on its bottom, a spiral or Archimedean screw fitted in the sleeve, and a set screw extending into the sleeve to the spiral or Archimedean screw to cause the latter to revolve as it is reciprocated, of a handle secured at one end to the cup and its opposite end having the spiral or Archimedean screw rotatably connected therewith whereby as the handle is compressed, the screw is reciprocated and rotated, and a plunger secured to the opposite end of the screw, said plunger carrying cutters at its outer edge adapted to traverse the inner walls of the cup and scoop the material therefrom.

In testimony whereof I affix my signature in presence of two witnesses.

FRANK BENJAMIN.

Witnesses:
GRACE V. MANNING,
WILLIAM W. MORRILL.